Patented June 9, 1931

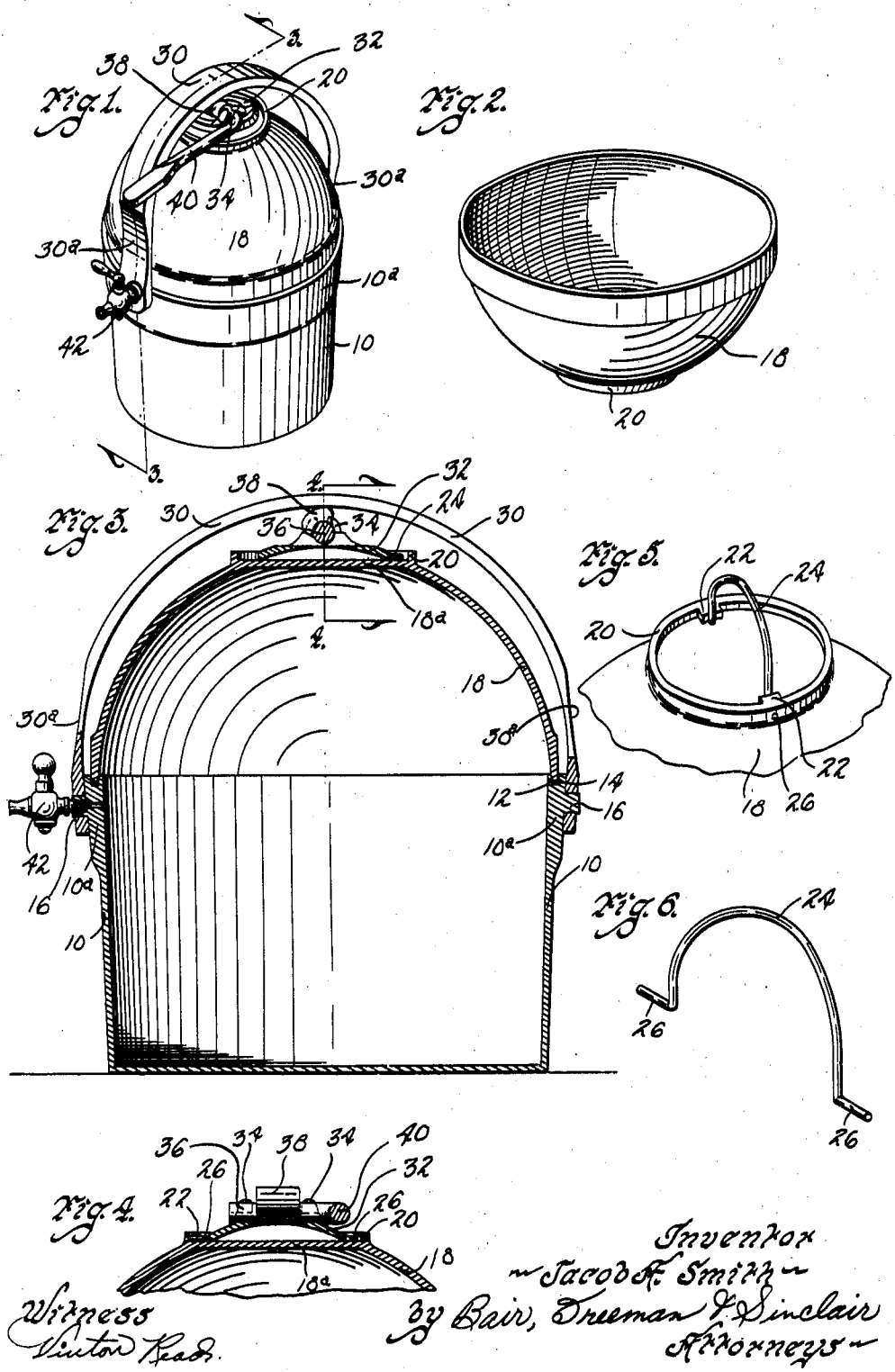

1,809,079

UNITED STATES PATENT OFFICE

JACOB A. SMITH, OF ANKENY, IOWA

STEAM PRESSURE COOKER

Application filed September 30, 1929. Serial No. 396,133.

The object of my invention is to provide a steam pressure cooker of simple, durable and inexpensive construction.

More particularly, it is my object to provide such a pressure cooker, which can be made of aluminum or other similar metal, comprising a container and a dome-shaped top, one being provided with a groove into which the edge of the other may fit and further to provide means for yieldingly gripping the two members together in such manner as to hold the steam pressure in the cooker to the proper maximum and yet to permit the escape of steam if the pressure should arise above a certain level.

Still another and important purpose of my invention is to provide in such a cooker, such a construction and arrangement of parts as will make possible the gripping together of the container and top without distorting the shape thereof, while holding them together for resistance to the degree of pressure within the cooker which may be desired.

In this connection, and more particularly, it is my purpose to provide a container and dome top as above mentioned with a flat substantially semi-circular bail, having its ends pivoted to the upper opposite sides of the container and made thinner than the intermediate portion of the bail, so that when a cam member is actuated between the central part of the bail and the dome top for forcing the top into gripping engagement with the container, the pull on the bail will be substantially upwardly and will not be so likely to distort the shape of the container, the container having a thickened portion at its upper edge to further resist any such distortion.

Another object is to provide such a cooker having a dome-like top of such shape and structure as to serve conveniently as a mixing bowl.

Still another object is to provide a steam pressure release cock peculiarly mounted.

With these and other objects in view, my invention consists in the construction, arrangement and combination of the various parts of my steam pressure cooker, whereby the objects contemplated are attained, as hereinafter more fully set forth, pointed out in my claim, and illustrated in the accompanying drawings, in which:

Figure 1 shows a perspective view of a steam cooker embodying my invention.

Figure 2 shows a perspective view of the top in inverted position.

Figure 3 is a vertical, detailed sectional view through the cooker.

Figure 4 is a detailed, sectional view taken on the line 4—4 of Figure 3.

Figure 5 is a perspective view of the upper portion of the top, parts being broken away; and Figure 6 is a perspective view of the small handle bail for the dome top.

In the accompanying drawings, I have used the reference numeral 10 to indicate generally the lower or container portion of my improved cooker, which may be made of cast aluminum or other suitable material.

This container 10 is preferably shaped slightly from bottom to top and at its upper edge is provided with a thickened annular portion 10a illustrated particularly in Figure 3, whereby the upper rim or part of the container is reinforced against that distortion which is likely to take place in such a structure when the top is fastened in place in the manner hereinafter referred to.

In the upper edge of the container 10a is an annular groove 12, in which is preferably received a suitable gasket 14 of asbestos and graphite, which will last for years without replacement.

At diametrically opposite points, the thickened portion 10a of the container 10 is provided with laterally projecting spindles 16 to receive the bail hereinafter referred to for pivotally supporting it.

For cooperating with the container 10, I provide a dome-shaped top or cover member 18, the edge of which is adapted to fit into the groove 12 and rest upon the gasket 14 as shown in Figure 3.

At the upper central part of the dome-shaped top 10 is a flat circular portion 18a, having at its upper surface an upwardly projecting peripheral flange or rib 20 having opposite inwardly projecting lugs 22, as shown in Figure 5.

A short wire handle bail 24 has offset ends 26 pivoted in holes 28 in the lugs 22 (see Figure 3). I provide a spring locking bail 30 in the form of a flat resilient metal member forming substantially half a circule as shown in Figure 3.

For purposes of illustration, I may say that the intermediate portion of the bail 30 is in the cookers, which have actually been marketed, one and one-fourth inches wide and five-sixteenths of an inch thick.

Near the ends of the bail 30 are thinner portions 30a, which in the bails actually in use are three-sixteenths of an inch thick.

The purpose of thinning the portions 30a will be referred to below.

For cooperating with the bail 30 and thus locking the dome top 18 on the container 10, I provide a movable cam device comprising an annular ring 32, having opposite bearings 34, in which is journaled a short shaft 36 on which between the journals is an eccentric cam portion 38.

Connected at one end of the shaft 36 is an angularly extending handle 40. (See Figures 3 and 4).

In locking the dome top to the container, the bail is raised to upright position as shown in Figure 3 and the ring 32 is placed on the flat portion 18 as shown in Figure 4 with the cam member 38 in lowered position.

The handle 40 (see Figure 1) is then raised from its lower position for swinging the cam 38 around to engage the under surface of the bail 30 for thus forcing the central part of the bail 30 and the dome top 18 apart.

It is obvious that the tendency of such action is to straighten the bail out.

I have found by a great many experiments that this tendency to straighten the bail out also has a strong tendency to distort the container from a true circle. This tendency to distort the container must be met in some way, and it is preferable that it be met without making the container heavy and thick.

I have cured the difficulty by providing the thickened portion 10a hereinbefore mentioned at the upper edge of the container and providing the thin portions 30a at the ends of the bail 30.

It will be obvious that when the cam is actuated to the position shown in Figure 3, it tends to force the bail upwardly and the dome top 18 downwardly. By providing the thin portions 30a, it is obvious that the bend in the bail then tends to occur at the thin portions and the thicker intermediate portions resists straightening out, so that the tendency on the bail is to pull more directly upwardly than is the case where the bail is of the same thickness throughout its length, while yet permitting sufficient resiliency for the operation of the cam.

By proper experimenting the size of the bail may be accurately determined, so that when the parts are adjusted for cooking, the container will hold steam to eight to ten pounds, and yet when the pressure goes up, so that it might otherwise be dangerous, the dome can be lifted sufficiently to allow some steam to escape, and thus avoid any explosion, while affording sufficient locking pressure for the purpose.

A steam gauge may be employed in testing or may be used on the cooker.

A half pint of water is sufficient to use in the container for cooking a meal. A meal can be cooked on a dining or heating stove, cook stove, gas or kerosene burner with a very moderate flame, which requires practically no attention after the flame is adjusted to the proper escaping of the steam pressure. This cooker can also be used as a roaster as it creates sufficient moisture to prevent burning, and it retains a sweet flavor, and for canning fruit it has no equal.

I have also provided a relief cock 42 projected through one of the spindles 46 and the adjacent wall of the container, so as to communicate with the interior of the container. Where such a cock is used, and the cooking has been completed, the cock should be opened slightly to allow escape of excess steam slowly. If the cock is fully opened, juices will shoot out, but this can be avoided by controlling the degree of opening.

It will be noted that the annular rib 20 serves several functions. It retains the ring 32 in proper position for the locking operation. It also affords a support on which the top may rest in inverted position, where it serves excellently as a mixing bowl, or can be used for cooking as an open vessel.

The handle member 24 is so arranged that when not in use, it may drop against the flat part 18a, so that when the dome top is used, as shown in Figure 2, in inverted position, the handle 24 may rest against such flat portion 18 and not interfere with the placing of the top on a flat surface.

I claim as my invention:

In a cooker, a container having a reinforced annular portion at its upper end formed with a groove in its upper surface, a dome top having an edge adapted to be received in said groove for thus cooperating with the container and having a flat upper central part with an upstanding annular rib, with opposite inwardly projecting lugs and a handle bail pivoted to said lugs, a curved resilient bail having end portions of substantially less thickness than its intermediate portion pivoted to opposite upper parts of the container, and an adjustable cam device interposed between the top and the central part of the bail for gripping the container and top together.

Des Moines, Iowa, November 8, 1928.

JACOB A. SMITH.